UNITED STATES PATENT OFFICE.

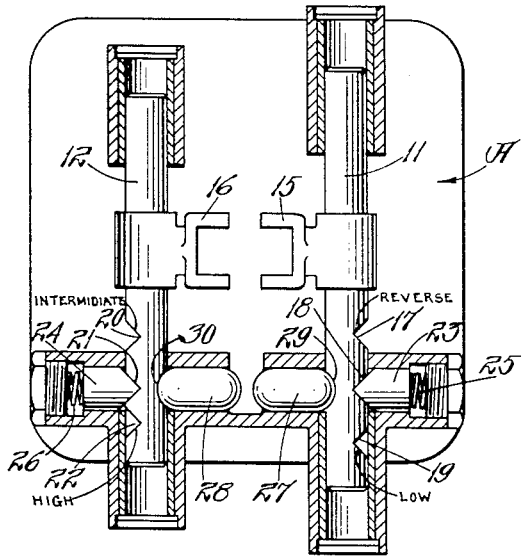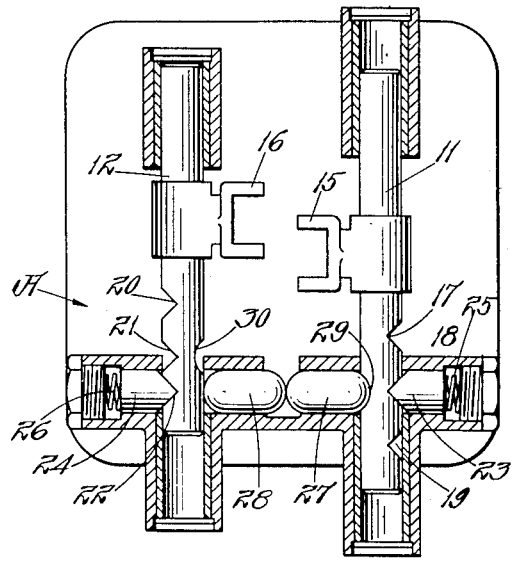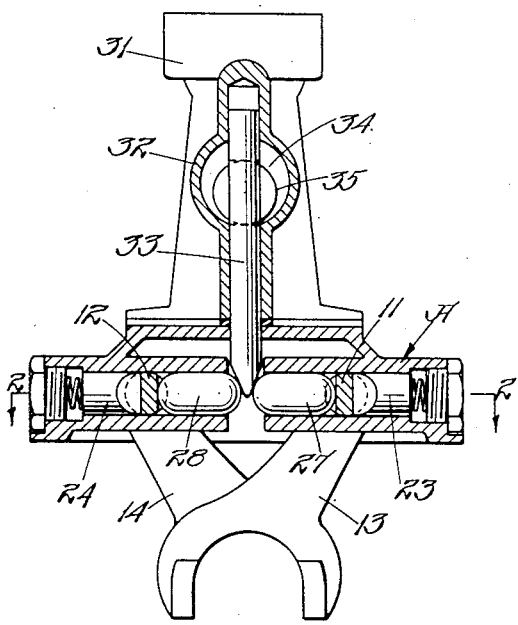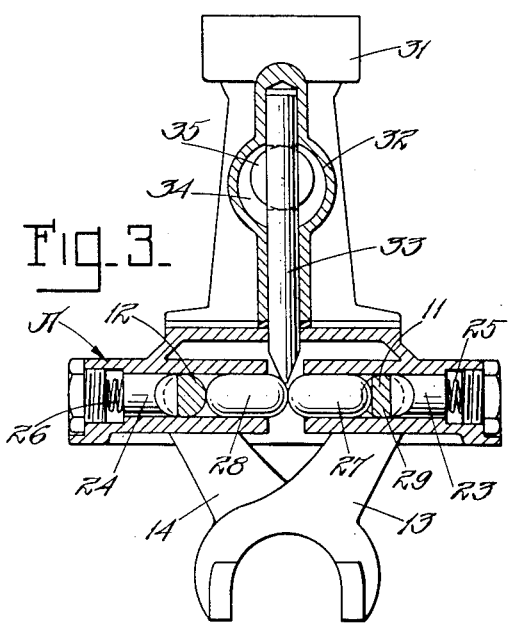

STEPHEN I. FEKETE, OF DETROIT, MICHIGAN, ASSIGNOR TO ESSEX MOTORS, OF DETROIT, MICHIGAN, A CORPORATION OF MICHIGAN.

TRANSMISSION-LOCK.

1,397,926.   Specification of Letters Patent.   Patented Nov. 22, 1921.

Application filed July 29, 1918. Serial No. 247,149.

*To all whom it may concern:*

Be it known that I, STEPHEN I. FEKETE, a subject of the King of Hungary, residing at Detroit, county of Wayne, State of Michigan, have invented a certain new and useful Improvement in Transmission-Locks, of which the following is a specification, reference being had therein to the accompanying drawings.

My invention relates to transmissions of the sliding gear type such as are used on automobile trucks, and the like. As is well known to those skilled in the art, it is necessary to provide transmissions of this type with an interlock by which one of the gear-shifting rods is held positively in neutral position whenever the other gear-shifting rod is in one of the gear-engaging positions. It is also well understood by those skilled in the art, that mechanism for locking the transmission rods so that the gears cannot be shifted affords most satisfactory protection against theft of the vehicle, since when the transmission is locked the car cannot be operated under its own power, although it may be rolled or towed. I am well aware that it has been proposed to lock transmission rods by means of balls and a wedge-shaped lock-operated bolt inserted between them, but this mechanism makes no provision for the necessary interlock, which must then be provided as a separate mechanism.

The mechanism embodying my invention combines the interlock and transmission lock in a single device, the parts of which perform both functions. The result is that both a transmission lock and an interlock can be provided for the cost of the transmission lock, thereby saving the entire cost of the interlock.

The invention will be fully understood by reference to the following description, taken in connection with the accompanying drawings, and the novel features thereof are pointed out and clearly defined in the claims at the close of this specification.

In the drawings, Figure 1 is a vertical section, looking forward of a transmission lock and interlock embodying my invention.

Fig. 2 is a horizontal section looking down, as indicated by the arrows in Fig. 1.

Fig. 3 is a view similar to Fig. 1, showing the position occupied by the parts when the gears are in high speed position.

Fig. 4 is a view similar to Fig. 2, the parts being in the position shown in Fig. 3.

At A is shown a transmission lock and at 11 and 12 the two sliding transmission rods carrying the gear forks 13 and 14. At 15 and 16 are shown the lever forks which engage the hand lever, not shown. The sliding transmission rods are each provided with three notches 17, 18, 19 and 20, 21, 22, respectively. These notches are engaged by pins 23 and 24 which are held yieldingly into the said notches by springs 25 and 26. These notches enable the operator to know by the feeling of the gear-shift lever when the gears are in their respective positions.

In the drawings, the respective notches in the two transmission rods have been marked to designate the low, intermediate, high, and reverse-gear positions. The middle notches 18 and 21 on both transmission rods indicate the neutral positions. Located between the two transmission rods 11 and 12, and in a cylindrical hole in the housing are two locking members 27 and 28, which have rounded ends corresponding in shape to two notches 29 and 30 in the proximate faces of the transmission rods 11 and 12. The notches 29 and 30 are opposite the neutral notches on the outsides of the transmission rods and therefore are in line when the gears are in neutral position. The two locking members 27 and 28 are of a combined length equal to the distance between the transmission rods 11 and 12, plus the depth of one of the notches 29 30. Therefore when the transmission rods 11 and 12 are in neutral position, the two locking members 27 and 28 may be separated by a space equal to the depth of one of the notches 29, 30.

When one of the transmission rods 11 and 12 has been moved to engage one of the gears, the other rod being in neutral position, one of the locking members 27, 28 will be in engagement with one of the notches 29, 30, and the other member will be in engagement with the other transmission rod at a point of full diameter so that the transmission rod which is in neutral position is locked positively against all movement. This may be clearly seen from Fig. 4, in which the transmission rod 12 has been shifted to engage the high speed gears, and the other transmission rod has been locked in place by the locking member 27 which engages the notch 29, being held in this position by the other locking member 28, the end of which contacts with the side of the transmission rod 12. It will be seen that this mechanism constitutes an interlock, so that when one transmission rod has been shifted to a gear-engaging position, the other is locked in neutral and cannot be moved from neutral position until the first mentioned transmission rod has been moved into neutral position and has released the interlock.

At 31 is shown the housing which supports the gear shift lever. This housing is secured to the upper surface of the transmission case A. On the rear of this housing is a casing 32 containing a vertical locking pin 33 having a wedge shaped point adapted to be inserted between the two locking members 27 and 28. This locking pin 30 is operated by a lock, the barrel of which is shown at 34, and the cam at 35. This lock may be of any well known construction and therefore is not described in greater detail. It is adapted to raise or lower the locking pin 33 as the case may be. When the transmission rods 11 and 12 are both in neutral position, the lock moves the locking pin 33 down between the ends of the locking members 27 and 28 and separates them, thus locking both the transmission rods in place. When so locked, the vehicle cannot be driven under its own power, although since the gears are in neutral the car may be rolled by hand or towed by another car.

It will be seen from the foregoing, that the locking members 27 and 28 perform the functions both of the transmission lock and interlock. The device embodying my invention, as will be seen, has no more parts than a transmission lock, but it performs all the functions of an interlock, as well as of a transmission lock, and therefore saves the entire expense of the interlock.

What I claim is—

1. The combination with two sliding transmission rods having a pair of alined notches in their proximate faces, a plurality of alined locking members freely movable between said transmission rods and of a combined length equal to the distance between the rods plus the depth of one of the notches, means coacting with the locking members to separate them and a lock for said means, said members adapted for receding from said notches on the movement of said locking means to released position.

2. The combination with two sliding transmission rods having a pair of alined notches in their proximate faces, a pair of alined freely movable locking members of a combined length equal to the distance between the rods plus the depth of one of the notches, a locking pin insertible between the said locking members and a lock operating said locking pin.

3. The improved transmission lock and interlock comprising a pair of transmission rods having alined notches in their proximate faces, a pair of alined locking members of a combined length equal to the distance between the transmission rods plus the depth of one of the notches, a locking pin disposed at substantially right angles to said members and normally out of the path of movement thereof, the lower end of said pin capable of being interposed between the locking members to separate them and lock the transmission rods, a lock therefor, said notches being opposite the neutral positions of said transmission and with said locking members forming an interlock.

4. The combination of a change speed gear casing; sliding gear shifting rods in said casing having apertures at their adjacent sides opposite each other in neutral position; a single straight passage extending between said apertures in said position of the rods; a plurality of parts all located in said single passage and adapted to reciprocate therein; a rod having its axis extending at right angles to said passage and its inner end extending into said passage, the inner end of said rod being shaped to act as a cam, so that the movement of said rod to one position shall cause said parts to engage in said apertures and moving the rod to another position shall permit said parts to recede from said apertures.

5. The combination of a change speed gear casing; sliding gear shifting rods in said casing having apertures at their adjacent sides opposite each other in neutral position; a single straight passage extending between said apertures in said position of the rods; a plurality of parts all located in said single passage and adapted to reciprocate therein, said parts being collectively of a length equal to the distance between the gear shifting rods plus the depth of one aperture; a rod having its axis extending at right angles to said passage and its inner end extending into said passage, the inner end of said rod being shaped to act as a cam, so that the movement of said rod to one position shall cause said parts to engage in said apertures and moving the rod to another position shall permit said parts to recede from said apertures.

6. The combination of a change speed gear casing; sliding gear shifting rods in said casing having apertures at their adjacent sides opposite each other in neutral position; a single straight passage extending between said apertures in said position of the rods; a plurality of parts all located in said single passage and adapted to reciprocate therein, said parts being collectively of a length equal to the distance between the gear shifting rods plus the depth of one aperture; a longitudinally movable rod having its axis extending at right angles to said passage and the line of movement of said gear shifting rods, and its inner end extending into said passage, the inner end of said rod being reduced to act as a cam so that the reciprocation of said rod to one position shall cause said parts to engage in said apertures, and the reciprocating of said rod to another position shall permit said parts to recede from said apertures, and a lock for said rod.

In testimony whereof I affix my signature.

STEPHEN I. FEKETE.